UNITED STATES PATENT OFFICE.

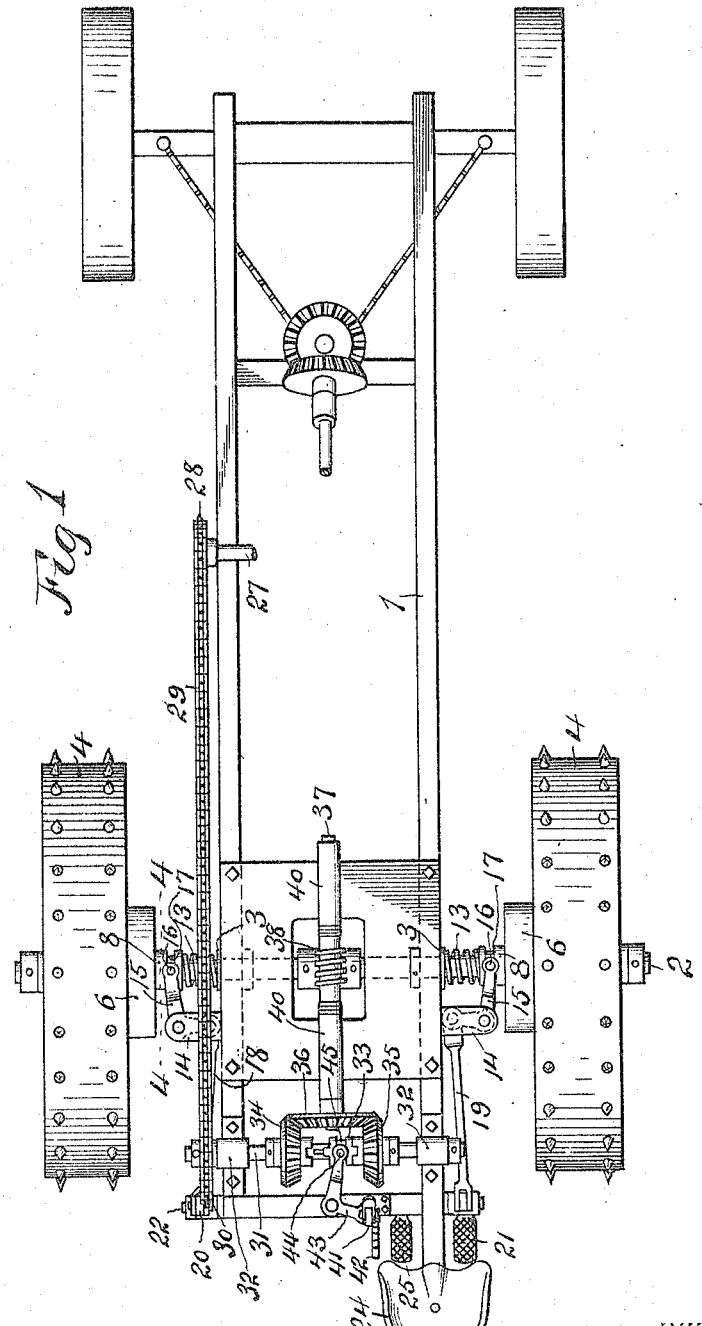

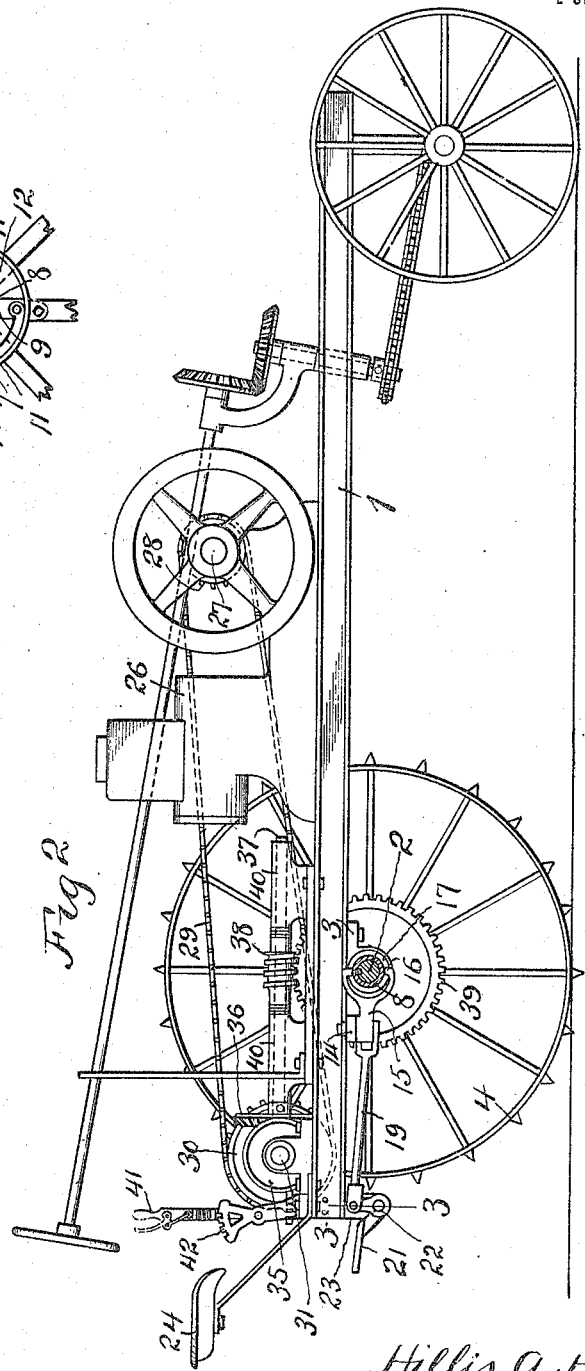

HILLIS A. HARRAH, OF POMONA, KANSAS, ASSIGNOR OF ONE-HALF TO LIZZIE T. LEIMBACH, OF ROSEDALE, KANSAS.

TRACTOR.

1,255,530.  Specification of Letters Patent.  Patented Feb. 5, 1918.

Application filed June 7, 1917. Serial No. 173,376.

*To all whom it may concern:*

Be it known that I, HILLIS A. HARRAH, a citizen of the United States, residing at Pomona, in the county of Franklin and State of Kansas, have invented a certain new and useful Improvement in Tractors, of which the following is a specification.

My invention relates to improvements in tractors.

One of the objects of my invention is to provide a tractor which may be easily and quickly operated to make short turns.

Another object of my invention is to provide a tractor transmission which is simple in construction, which is powerful, which distributes the strain equally between the driving wheels, and in which the strain upon the frame will be so distributed and directed as to reduce to a minimum the distortion of the frame due to the strain applied thereto by the transmission.

Other novel features of my invention are hereinafter fully described and claimed.

In the accompanying drawings, which illustrate the preferred embodiment of my invention, Figure 1 is a plan view, partly broken away, of my improved tractor.

Fig. 2 is a side view of the same, partly in vertical section and partly in elevation.

Fig. 3 is a vertical sectional view on the line 3—3 of Fig. 2.

Fig. 4 is a vertical sectional view on the line 4—4 of Fig. 1.

Similar reference characters designate similar parts in the different views.

1 designates the frame of the tractor. The frame may be of any suitable form and type. It is preferably rectangular and built up of structural steel.

2 designates the rear axle which is rotatably mounted in bearings 3 secured to the under side of the frame 1. Rotatable on the axle 2 are two traction wheels 4 which are adapted to be independently locked to the axle 2 by two friction clutches. Each of these friction clutches is composed preferably of the following described parts.

Referring particularly to Fig. 4, 5 designates a clutch member secured to the adjacent wheel 4 concentrically to the axle 2. The clutch member 5 is provided with an annular flange 6 against the inner surface of which two arcuate shoes 7 are adapted to have locked frictional engagement. Longitudinally slidable on the axle 2 and splined thereto so as to rotate therewith is a member 8 having two radial oppositely extending arms 9 to which are respectively pivoted one set of ends of the shoes 7. Pivoted respectively to the other ends of the shoes 7 are two members 10 having screw-threaded inner ends on which are respectively mounted two nuts 11 which are also respectively mounted on the screw-threaded outer ends of two radial members 12, the inner ends of which are pivoted to the adjacent slidable member 8. The members 10 and 12 are oppositely threaded, so that the free ends of the shoes 7 may be adjusted toward and from the flange 6.

When the member 8 is forced outwardly to the position shown in Figs. 1 and 4, the shoes 7 will be forced against the flange 6 so as to have locked engagement therewith. Encircling the axle 2 are two coil springs 13 the inner ends of which bear against the frame 1 and the outer ends of which bear respectively against the two slidable members 8 so as to normally force the latter to the locking position, shown in Fig. 1. When the clutches are in the locked position both traction wheels 4 will be locked to the axle 2. When it is desired to turn to the left, the left friction clutch is released from the adjacent traction wheel 4, so that the tractor will be propelled only by the right traction wheel. In turning to the right the other clutch is released.

As the engagement between the axle and the traction wheels is by friction only, the clutches may be readily released by the operator whether the machine is pulling or standing still. With tractors employing dental clutch connections between the axle and the traction wheels, it is extremely difficult to disengage the clutches when the machine is pulling a load. With my improvement this difficulty is eliminated.

For independently operating the two friction clutches, the following described mechanism is preferably employed.

Secured to opposite sides of the frame 1 are two brackets 14 to which are respectively pivoted two bell crank levers 15, each having one bifurcated arm provided with pins 16 mounted in an annular peripheral groove 17 in the adjacent member 8. The other arms of the levers 15 are respectively pivoted to the forward ends of two rods 18 and 19 which are respectively pivoted at their rear ends to a crank 20 and an operating bell crank pedal 21. The pedal 21 is pivoted loosely on a transverse horizontal rock shaft 22 oscillatively mounted in bearing 23 secured to the frame 1, and having secured to it the crank 20.

The operator sitting on a seat 24 supported by the frame 1, may with his right foot depress the pedal 21, thereby sliding inwardly the right member 8 so as to release the right clutch from the right wheel 4. Secured rigidly to the rock shaft 22 is a pedal 25, which on being depressed by the left foot of the operator rocks the shaft 22 so as to release the left clutch, through the intermediacy of the mechanism already described.

For rotating the axle 2, the following mechanism may be employed.

26 designates an explosive engine mounted on the frame 1 and having mounted on its crank shaft 27 a sprocket wheel 28, which is connected by a chain belt 29 with a sprocket wheel 30 secured to a transverse horizontal shaft 31 rotatably mounted in bearings 32 carried by the frame 1.

Slidably splined on the shaft 31 is a clutch member 33, which is adapted to be slid from a central neutral position into alternate engagement with two bevel gear wheels 34 and 35 which run loose on the shaft 31 and which are constantly in mesh with a bevel gear wheel 36 secured to the rear end of a horizontal longitudinal shaft 37 provided with a worm 38, which meshes with a worm wheel 39, which is rigidly secured to the axle 2, preferably midway between the traction wheels 4, and, preferably, at the longitudinal center of the frame 1.

The worm shaft 37 is rotatably mounted in bearings 40 secured to the frame 1. By having the worm shaft disposed longitudinally and in the longitudinal center of the frame 1, the thrust of the shaft is exerted in a direction and at such places as to place a minimum of distortional strain upon the frame 1. The location of the worm wheel 39 midway between the wheels 4 causes the torsional strain on the axle to be evenly divided.

For shifting the clutch member 33, any suitable means may be provided. For effecting this, I provide an operating lever 41 which is pivoted to a standard 42 secured to the frame 1, the lower end of the lever 41 having pivoted engagement with one arm of a horizontal bell crank lever 43 which is pivoted to the frame 1, and the other arm of which is bifurcated and provided with pins 44 which are mounted in an annular peripheral groove 45 in the clutch member 33. By swinging the lever 41 forward and backward, the clutch member 33 may be thrown from the neutral position into engagement with either of the bevel gear wheels 34 and 35, as may be desired.

I do not limit my invention to the structure shown and described, as modifications, within the scope of the appended claims, may be made without departing from the spirit of my invention.

What I claim is:—

1. In a tractor, a rotary axle, two traction wheels rotatable thereon, means for rotating said axle, two friction clutches for respectively releasably locking said traction wheels to said axle and respectively including two members slidably splined to said axle and movable thereon to and from the locking position, means for normally forcing said slidable members to the locking position, a rock shaft, an operating pedal secured to said rock shaft, means actuated by said rock shaft for forcing one of said slidable members to the unlocked position, an oscillatable operating pedal, and means actuated by said oscillatable pedal for forcing the other slidable member to the unlocked position.

2. In a tractor, a rotary axle, two traction wheels rotatable thereon, two friction clutches for respectively locking said traction wheels to said axle and respectively including two members slidably splined to said axle and movable thereon to and from the locking position, means for normally forcing said slidable members to the locking position, two levers respectively connected with said slidable members for forcing them to the unlocked position, a rock shaft having a crank, a rod connecting said crank with one of said levers, an operating pedal secured to said rock shaft, an oscillatable pedal oscillatively mounted on said rock shaft, and a rod connecting the oscillatable pedal with the other lever.

3. In a tractor, a rotary axle, two traction wheels rotatable thereon, two clutches for respectively locking said wheels to said axle and including respectively two members slidably splined to said axle and movable thereon to and from the locking position, two springs for normally forcing said slidable members respectively to the locking position, two levers engaging said slidable members respectively for forcing them to the unlocked position, a rock shaft having a crank, an operating pedal secured to said rock shaft, an oscillatable operating pedal, and two rods having one set of ends respectively pivoted to said levers and having their other set of ends respectively pivoted to said crank and said oscillatable operating pedal.

In testimony whereof I have signed my name to this specification.

HILLIS A. HARRAH.

Copies of this patent may be obtained for five cents each, by addressing the "Commissioner of Patents, Washington, D. C."